United States Patent
Ikeda et al.

(10) Patent No.: US 7,639,905 B2
(45) Date of Patent: Dec. 29, 2009

(54) CHANNEL SWITCHING SYSTEM AND METHOD OF IPTV SERVICE IN PASSIVE OPTICAL NETWORK

(75) Inventors: Hiroki Ikeda, Hachioji (JP); Nie Yaling, Beijing (CN)

(73) Assignee: Hitachi, Ltd., Tokyo (JP)

( * ) Notice: Subject to any disclaimer, the term of this patent is extended or adjusted under 35 U.S.C. 154(b) by 442 days.

(21) Appl. No.: 11/727,511

(22) Filed: Mar. 27, 2007

(65) Prior Publication Data

US 2007/0230956 A1 Oct. 4, 2007

(30) Foreign Application Priority Data

Mar. 31, 2006 (CN) .................... 2006 1 0071060

(51) Int. Cl.
*G02B 6/26* (2006.01)
(52) U.S. Cl. .................. 385/16; 385/15; 385/24; 398/43; 398/66; 398/67
(58) Field of Classification Search .......... 385/15, 385/16, 24; 398/43, 66, 67
See application file for complete search history.

(56) References Cited

U.S. PATENT DOCUMENTS

| 7,143,116 | B2 * | 11/2006 | Okitsu et al. ............... 707/200 |
| 7,552,214 | B2 * | 6/2009 | Venkatasubramanian .... 709/225 |
| 2005/0265386 | A1 | 12/2005 | Smith et al. |

* cited by examiner

*Primary Examiner*—Jennifer Doan
(74) *Attorney, Agent, or Firm*—Stites Harbison, PLLC; Juan Carlos A. Marquez, Esq.

(57) ABSTRACT

Channel switching system and method of an IPTV service in a passive optical network (PON) are disclosed. To reduce a channel switching time of an IPTV system in the passive optical network, the system and the method use a channel switching control module and a channel list module in the passive optical network. In a case where a passive optical network system receives an IPTV channel switching request transmitted from a terminal user, the channel switching control module checks a recording of a channel list module and a recording of an authentication list module, and then updates a filter recording of an optical network unit to thereby directly transmit an image flow of a new channel in the passive optical network. When such system and method are applied to the passive optical network, high-speed switching of the IPTV service channel by the terminal user can be realized.

14 Claims, 10 Drawing Sheets

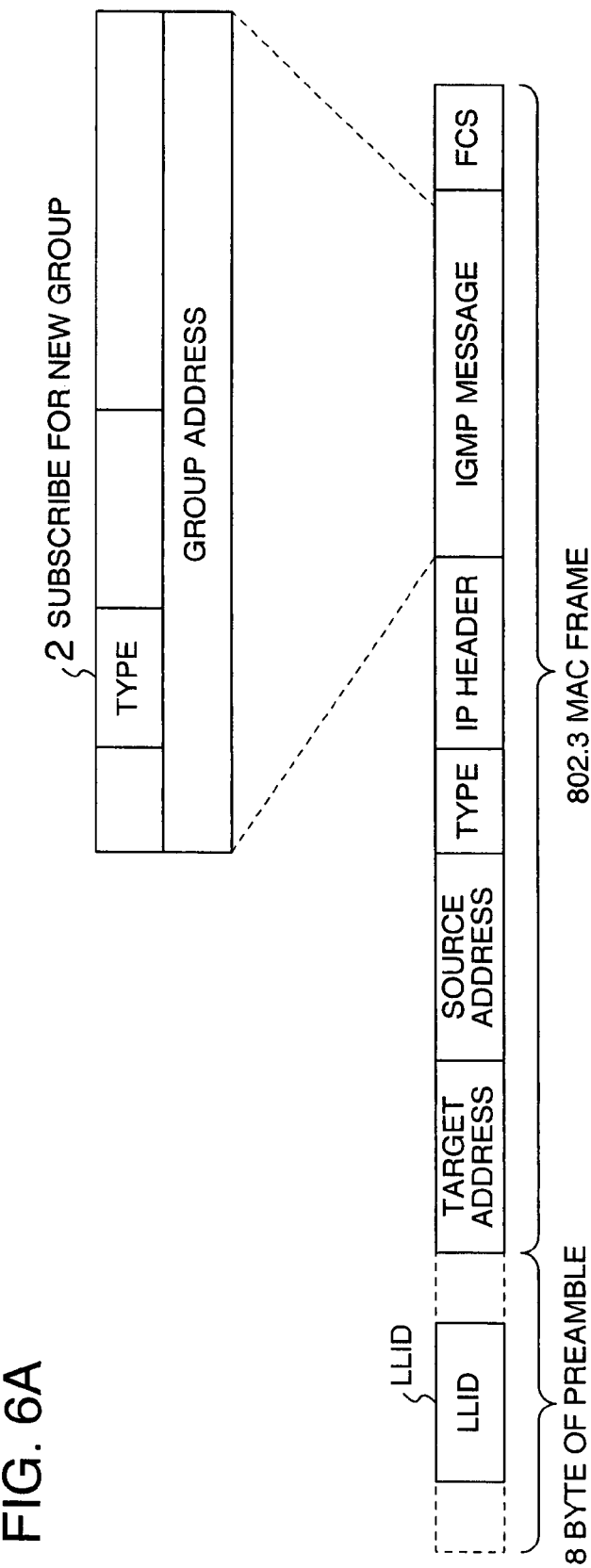
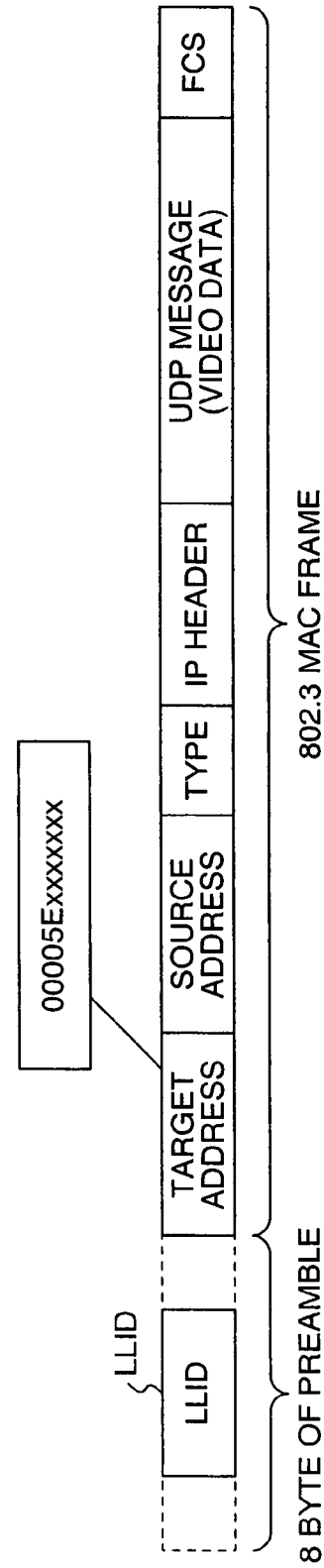
FIG. 6A
FIG. 6B

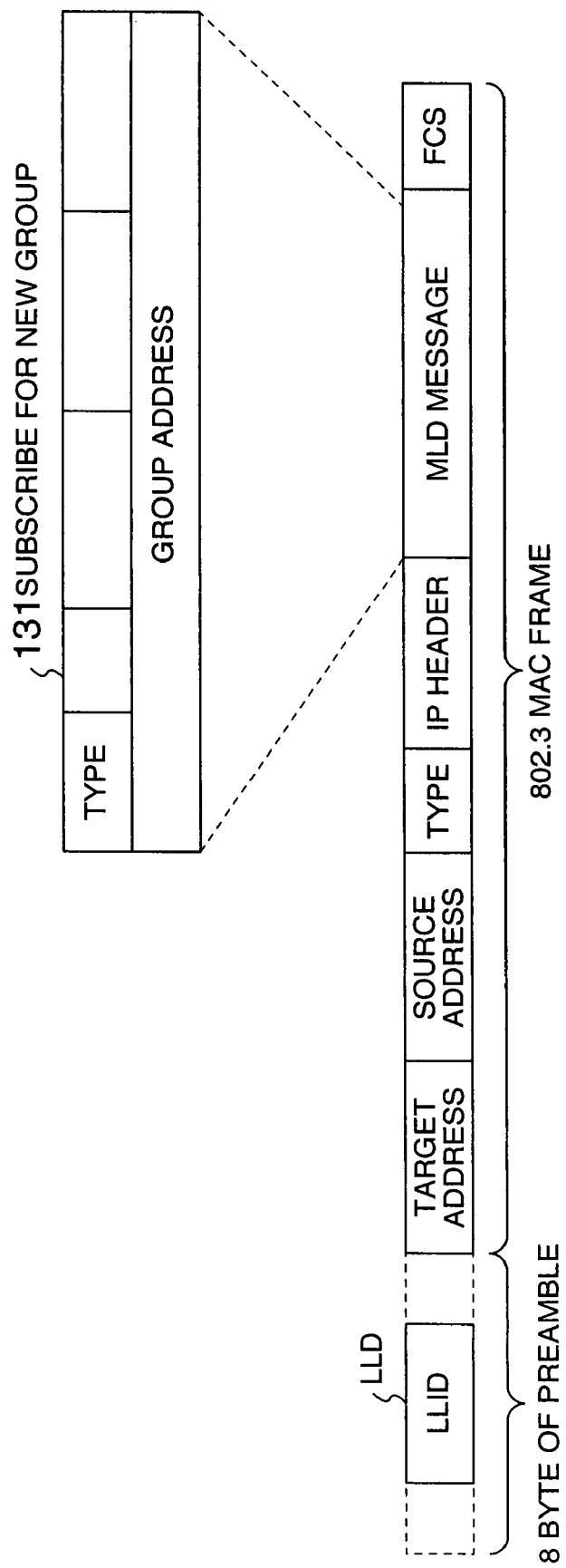

CHANNEL SWITCHING SYSTEM AND METHOD OF IPTV SERVICE IN PASSIVE OPTICAL NETWORK

INCORPORATION BY REFERENCE

The present application claims priority from Japanese application CN 200610071060.8 filed on Mar. 31, 2006, the content of which is hereby incorporated by reference into this application.

BACKGROUND OF THE INVENTION

1. Field of the Invention

The present invention relates to a network which provides an IPTV service by use of a passive optical network as an access network. The present invention more particularly relates to a system and a method in which a channel of an IPTV service is switched in a passive optical network.

2. Description of the Related Art

These days, a broadband service has been a telegraphic service remarkably important for an internet service provider and a terminal user. The passive optical network is regarded as a technology for the next generation that provides a broadband access.

An IPTV system changes an entertainment system of the terminal user from cable television to network television and from broadcasting television to interactive television. However, to provide an IPTV service in the existing IP network, a large number of technical supports such as a service quality technology and a safety technology are required. In addition, several problems have to be preferentially solved.

Among the problems, a channel switching time is one of important parameters of IPTV. In a conventional cable television system, the channel switching time is usually 100 milliseconds or less, and this can satisfy a demand of the terminal user during channel switching. However, in an IPTV system, a technology of encapsulation of an IP packet is used for image data and control information, and a TCP/IP system is a transmission system which derives the maximum capability. When the user needs to switch the channel, a time required for transmission of a channel switching request and reception of a request acknowledgment message from an image server is largely influenced by a network situation. Therefore, according to the existing technology, the channel cannot be switched at a high speed.

In U.S. Patent No. US2005/0265386A1, an image based on IP is transmitted using a WDM technology, and a PON packet format is corrected. However, the technology simply controls the switching of the channel by use of an IGMP protocol, and a problem that the channel be switched at a high speed is not solved. Since the passive optical network has a high optical transmission speed, a high-speed device including three layers is required in order to filter all IPTV signals through an IP layer. However, all IPTV terminals do not have a high-speed IPTV signal filter device.

SUMMARY OF THE INVENTION

An object of the present invention is to provide an optical line terminal, an optical network unit and passive optical network system and method in which a channel of an IPTV service is switched in a passive optical network so that a channel switching time of an IPTV user in the passive optical network can be reduced.

To realize the object of the present invention, according to the present invention, there is provided an optical network unit (ONU) of a passive optical network system having an optical line terminal (OLT) and a plurality of optical network units connected to terminal users and the optical line terminal. The optical network unit comprises: a memory; a photoelectric conversion unit which photoelectrically converts signals from each terminal user and the optical line terminal; and a frame processing unit having a monitoring unit which monitors a channel request transmitted from the terminal user and an optical layer filter which selectively transmits, to the terminal user, a frame signal transmitted through the optical line terminal from an IPTV server. The memory holds a channel list to record a correspondence between channel information and optical transmission information of a channel of the passive optical network. The optical network unit further has a control unit, and executes control based on channel information of a switch channel included in a channel switching request of the terminal user acquired from the monitoring unit with reference to the channel list so that the optical layer filter selects the frame signal having the optical transmission information corresponding to the channel information of the switch channel, and transmits the frame signal to the terminal user.

According to the present invention, there is provided an optical line terminal of an optical network system having a plurality of optical network units connected to terminal users and an optical line terminal connected to the optical network units. The optical line terminal comprises: a memory; a PON transmission/reception unit which receives a frame signal from an IPTV server to transmit the frame signal to each optical network unit; and a frame processing unit having a monitoring unit which monitors a channel request transmitted from the terminal user. The memory holds a channel list to record a correspondence between channel information and optical transmission information of a channel of the passive optical network. The optical network unit further has a control unit. The optical line terminal distributes the optical transmission information of a switch channel based on the channel information of the switch channel included in a channel switching request of the terminal user acquired from the monitoring unit with reference to the channel list, and notifies the optical network unit of a result of the distribution to switch the channel.

According to the present invention, there is provided a passive optical network system comprising: an optical line terminal; and a plurality of optical network units connected to terminal users. Each of the optical network units includes: a memory; a photoelectric conversion unit which photoelectrically converts signals from each terminal user and the optical line terminal; and a frame processing unit having a monitoring unit which monitors a channel request transmitted from the terminal user and an optical layer filter which selectively transmits, to the terminal user, a frame signal transmitted through the optical line terminal from an IPTV server. The memory holds a channel list to record a correspondence between channel information and optical transmission information of a channel of the passive optical network. The optical network unit further has a control unit, executes control based on the channel information of a switch channel included in a channel switching request of the terminal user acquired from the monitoring unit with reference to the channel list so that the optical layer filter selects the frame signal having the optical transmission information corresponding to the channel information of the switch channel, and transmits the frame signal to the terminal user. The optical line terminal includes: a memory; a PON transmission/reception unit which receives a frame signal from an IPTV server to transmit the frame signal to the optical network unit; and a frame processing unit having a monitoring unit which monitors a channel request transmitted from the terminal user. The memory holds a channel list to record the correspondence between the channel information and the optical transmission information of the channel of the passive optical network. The optical network unit further has a control unit. The passive optical network system distributes optical transmission information of the switch channel and notifies the optical network unit of a result of the distribution to switch the channel based on the channel information of the switch channel included in the channel switching request of the terminal user acquired from the monitoring unit with reference to the channel list.

According to the present invention, there is further provided a method of realizing channel switching in a passive optical network.

In the passive optical network, switching of a channel at a high speed can be realized using the present invention. The present invention supplies a high-speed channel switching technology to an internet service provider, and simultaneously provides a satisfactory service to a terminal user.

Other objects, features and advantages of the invention will become apparent from the following description of the embodiments of the invention taken in conjunction with the accompanying drawings.

BRIEF DESCRIPTION OF THE DRAWING

FIG. 6A is a schematic diagram showing Ethernet packet encapsulation of an IGMP packet;

FIG. 6B shows a multicast message including channel data transmitted from an IPTV server or an optical line terminal;

FIG. 7 is a schematic diagram showing Ethernet packet encapsulation of an MLD packet;

DETAILED DESCRIPTION OF THE INVENTION

The present invention mainly has the following characteristics: 1) in a system and a method of the present invention, a passive optical network system uses channel switching control and a channel list; 2) in the system and the method, a passive optical network further uses authentication monitoring and control and an authentication list, in a case where a plurality of internet service providers (ISP) need to be authenticated; 3) the channel list is updated by an IGMP (for use in an IPv4 network) or MLD (for use in an IPv6 network) monitoring unit; 4) recording of the authentication list is updated by authentication monitoring and control; 5) a frame having optical transmission information corresponding to an IPTV channel request is selected to transmit the frame to a terminal user based on a channel switching list, in a case where a frame processing unit monitors the IPTV channel request transmitted from the terminal user; and 6) the system and the method can be realized in both of an optical line terminal OLT and an optical network unit ONU at the same time, and can be realized simultaneously in the optical line terminal and the optical network unit.

Figure 1:
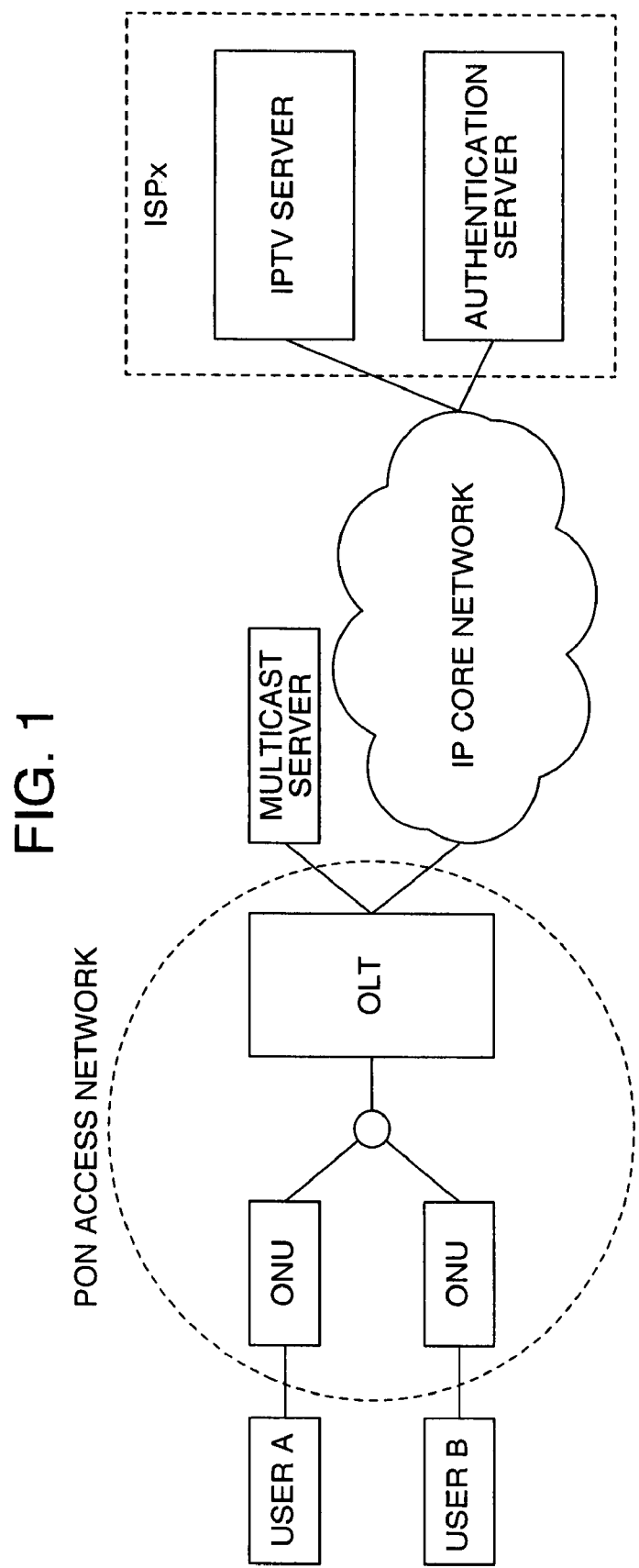
FIG. 1 is a structure diagram of a system which provides an IPTV service.

FIG. 1 is a structure diagram of a system which provides an IPTV service. As shown in FIG. 1, an internet service provider "ISPX" provides IPTV services to users A and B through an IPTV server and an authentication server via an IP core network and an access network. The IP core network includes a multicast server. The access network is a passive optical network PON including optical network units ONU and an optical line terminal OLT. The optical network units ONU and the optical line terminal OLT are connected to one another via optical fibers. The terminal users A, B and the like are connected to the optical network units ONU to access the network. In IPTV channel data, a multicast is transmitted by use of the multicast server, and broadcasting transmission is not used. The terminal user can pay a fee to the corresponding content provider to view any user's favorite program.

The channel switching of the present invention may be realized by the optical network unit or the optical line terminal of the passive optical network. Both of the optical network unit and the optical line terminal may simultaneously be used to realize the switching. First, a process will hereinafter be described in which the channel switching of the present invention is realized using the optical network unit.

Figure 2:
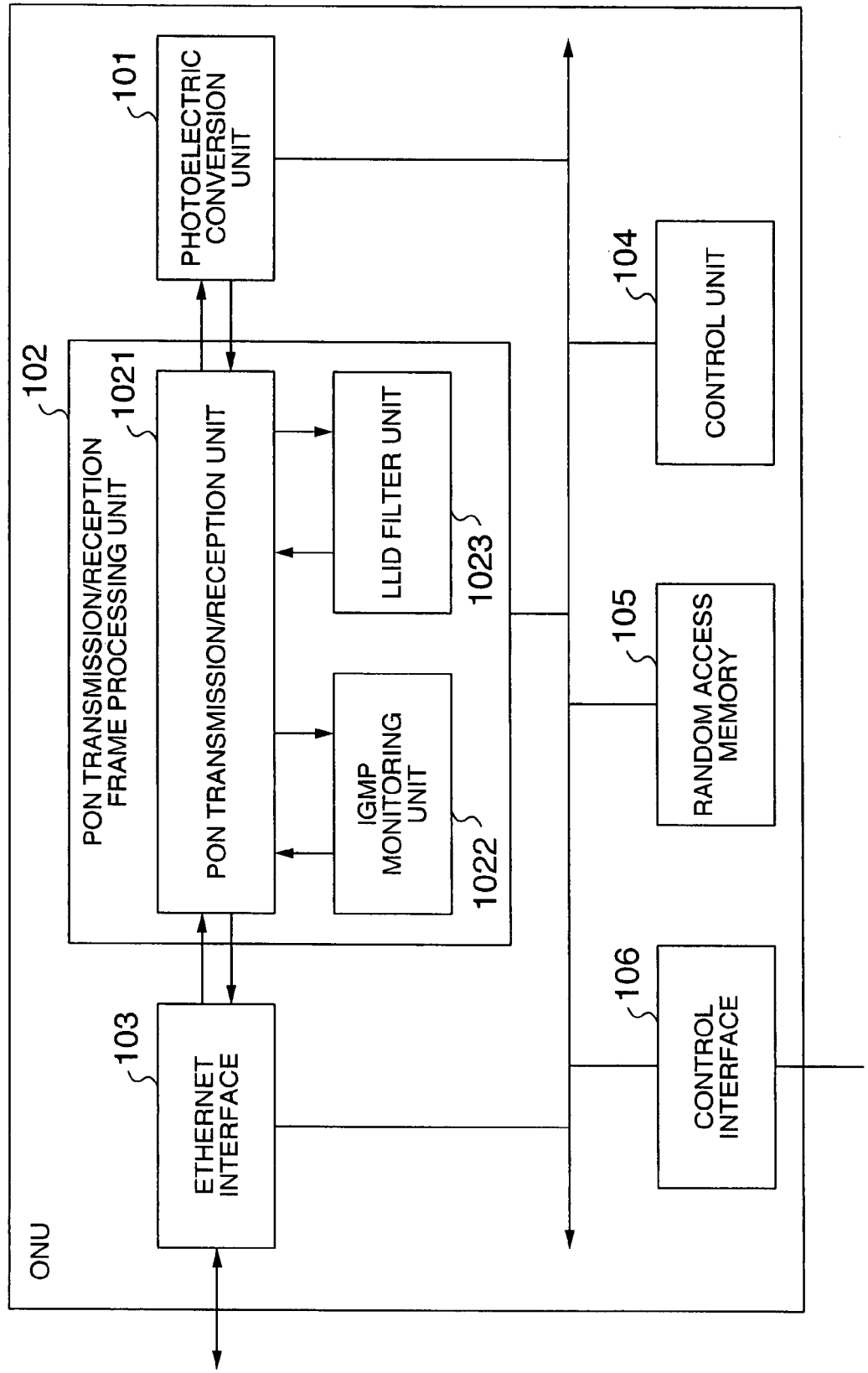
FIG. 2 is a schematic diagram to realize hardware of an optical network unit ONU according to the present invention.

FIG. 2 shows a structural block diagram of the optical network unit ONU of the present invention. The optical network unit (ONU) includes a photoelectric conversion unit 101, a PON transmission/reception frame processing unit 102, an Ethernet interface 103, a control unit 104, a memory 105 and a control interface 106. The PON transmission/reception frame processing unit 102 includes a PON transmission/reception unit 1021, an IGMP monitoring unit 1022 and an LLID filter unit 1023. Here, a structure of a microprocessor may be used in a control device.

The above IGMP stands for an internet group management protocol, is a sub-protocol of a TCP/IP protocol group, and permits subscription for a multicast of an internet main machine. That is, an IP main machine is for use in reporting a protocol related to a group to an adjacent multicast router. The IGMP monitoring unit monitors a message of an IGMP format.

The photoelectric conversion unit 101 converts an electric signal from an ascending user terminal into an optical signal to be transmitted in the passive optical network to transmit the signal to the optical line terminal. The photoelectric conversion unit converts an optical signal of the passive optical network transmitted from a descending optical line terminal into an electric signal to be transmitted to the user terminal. The IGMP monitoring unit 1022 of the PON transmission/reception frame processing unit 102 monitors a transmitted data frame (here, an IGMP packet), and acquires an IGMP message from the frame. The LLID filter unit 1023 has a function of receiving an optical frame of the passive optical network transmitted from the descending optical line terminal, and selecting the optical frame of the passive optical network transmitted from the optical line terminal based on an LLID value of the corresponding optical network unit to transmit the frame to the descending optical line terminal. That is, when the LLID value of the optical frame of the passive optical network transmitted from the optical line terminal belongs to the LLID value of the present optical network unit, the optical frame is permitted to pass. When the LLID value of the optical frame of the passive optical network transmitted from the descending optical line terminal does not belong to the LLID value of the present network unit, the optical frame is discarded.

The memory 105 is a random access memory unit of the present embodiment. In the memory, a channel list is stored in which the corresponding channel optical transmission information (e.g., "24") corresponding to channel information (e.g., a multicast address "225.1.1.21") received by the passive optical network is recorded. Contents of the channel list stored in the memory unit will be described later in detail.

Figure 4:
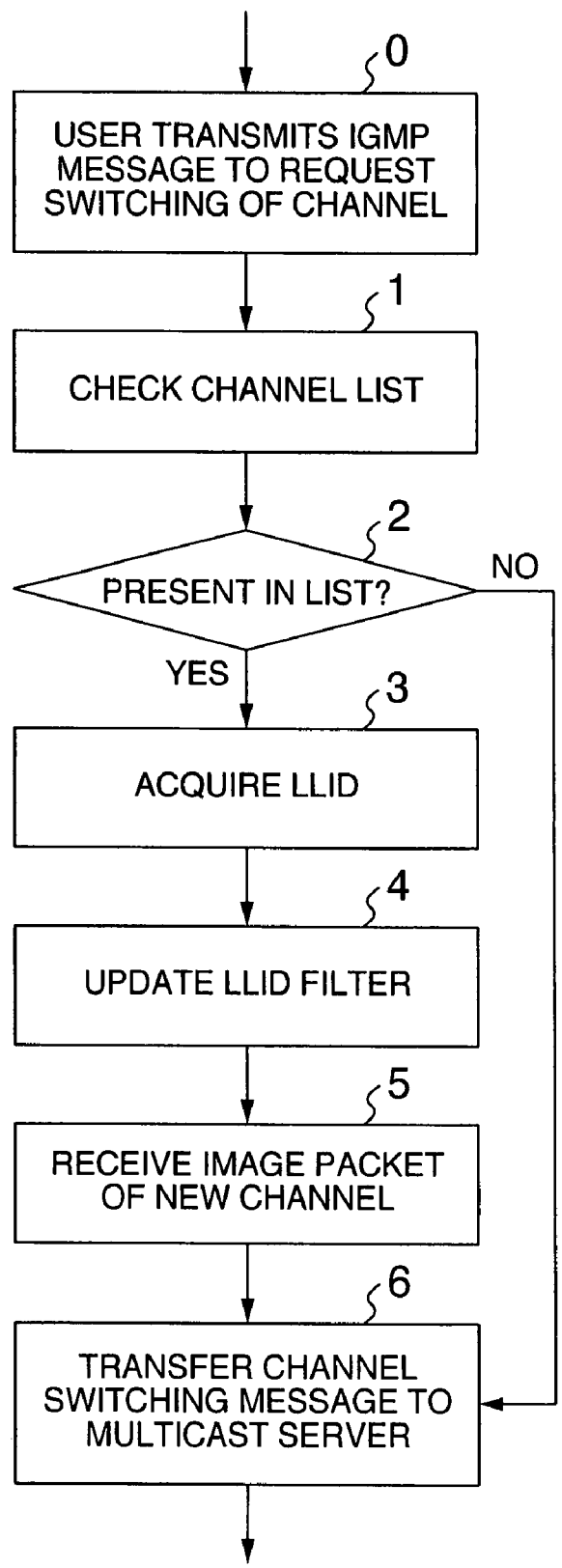
FIG. 4 is a flow chart of an IPTV channel switching method.

A channel switching process of the present invention will be described hereinafter in detail with reference to FIG. 4. In general, the terminal user views a predetermined channel program at a predetermined time. It is to be noted that the network supplies services to one million users or ten million users through the multicast. When the user switches one channel to another channel, the channel is switched in the following process.

First, in the passive optical network, the PON transmission/reception unit 1021 of the optical network unit ONU receives an IPTV channel switching request transmitted from the terminal user. Moreover, the IGMP monitoring unit 1022 of the optical network unit monitors the channel switching request. In the request, an IGMP (corresponding to an IPv4 protocol) or MLD (corresponding to an IPv6 protocol) message is used. The process will be described in accordance with an example of the IGMP corresponding to the IPv4 protocol with reference to FIG. 4. An MAC frame format of the message is shown in FIG. 6. The multicast address (the multicast address is, e.g., "225.1.1.21") of the new channel can be acquired from the IGMP message. Here, it can be considered that the multicast address belongs to an IP layer and corresponds to the channel information.

Next, the control unit 104 of the optical network unit checks the channel list by use of the multicast address as an index.

When the control unit 104 finds a recording of the new channel from the channel list, the unit acquires the LLID value (e.g., "24") corresponding to the new channel, that is, the optical transmission information from the channel list, and updates an LLID filter (an optical layer filter) of the optical network unit ONU connected to the user to receive an image packet of the new channel. In consequence, the user receives data of the new channel. Moreover, the user transfers the channel switching request to the multicast server and the IPTV server.

Here, an example in which the LLID is used in the optical transmission information has been described above, but T-Cont of a GPON may be used. In this case, the optical layer filter corresponds to T-Cont. The GPON is a gigabit passive optical fiber network, and a new-generation passive optical fiber network proposed by ITU-T subsequently to an EPON. The T-Cont is a value for use in filtering a data packet of the optical network unit in a GPON system. A function of the GPON system is the same as that of an EPON system of the LLID.

When there is not any recording of the new channel, the channel switching request is directly transferred to the multicast server and the IPTV server. The IPTV server and the multicast server provide the IPTV service based on the same technology as the conventional technology. This process is the same as a process in which the conventional terminal user transmits the channel switching request through the network and acquires an acknowledgement of the IPTV server.

Figure 5:
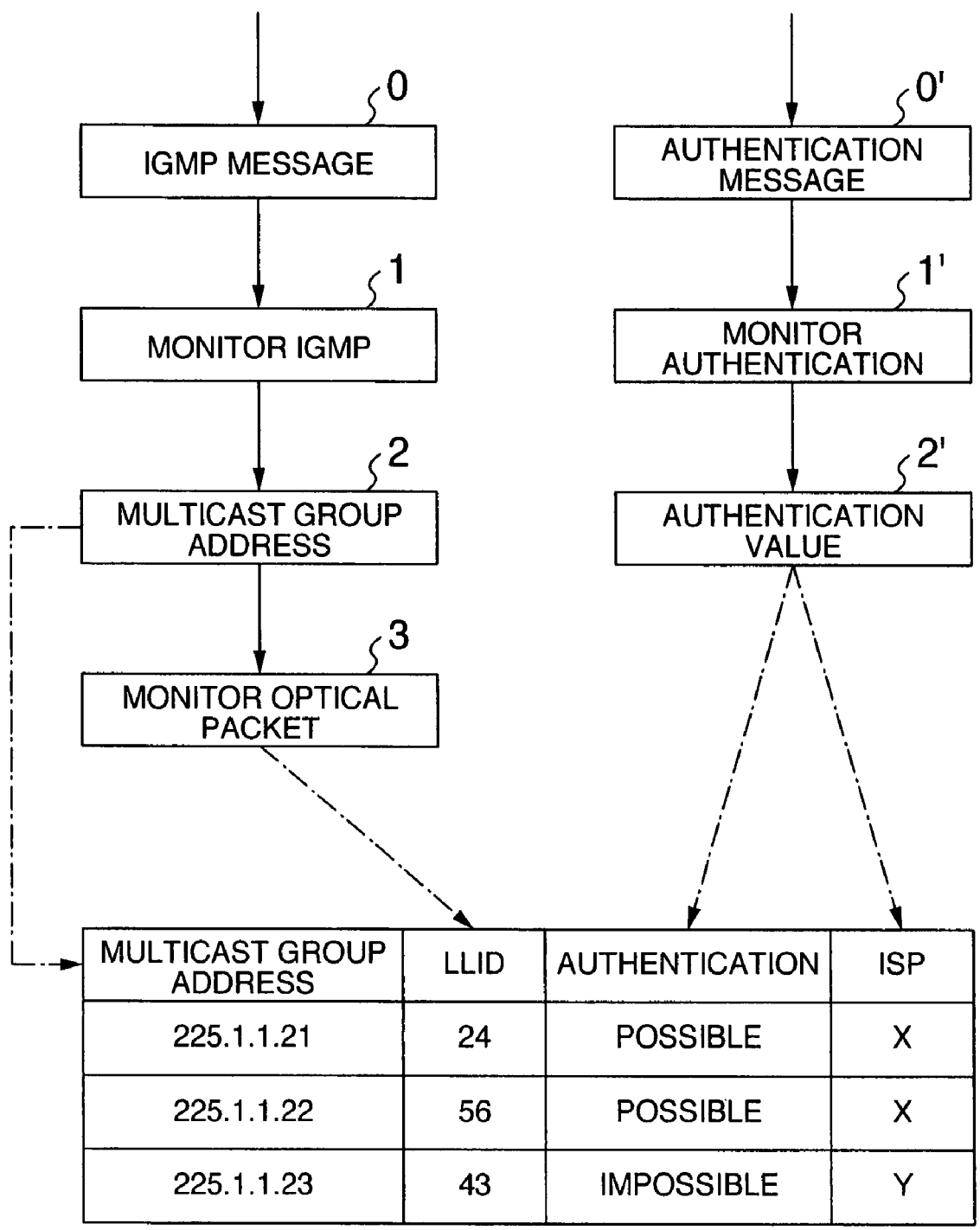
FIG. 5 is a flow chart of a method of generating an IPTV channel list.

FIG. 5 shows generation and maintenance of the IPTV channel list. When the IPTV channel list is present in the optical network unit ONU, first the PON transmission/reception unit 1021 of the optical network unit ONU receives the IPTV channel request transmitted from the terminal user. Moreover, the IGMP monitoring unit 1022 of the optical network unit monitors the request for the channel. In the request, the IGMP or an MLD message is used.

The IGMP monitoring unit monitors a message shown in FIG. 6A, and acquires a multicast group address (e.g., "225.1.1.21") of the new channel. In a case where a value of a "type" in the IGMP message is, for example, "2", it is meant that the user subscribes for a multicast group to which the new channel belongs and that the channel is started.

Subsequently, the PON transmission/reception unit 1021 of the optical network unit monitors a multicast message (the message shown in FIG. 6B, an MAC target address starts with 11115E) including image data transmitted from the optical line terminal. When the target address of the multicast message is the multicast address (e.g., "225.1.1.21") of the new channel, the PON transmission/reception unit 1021 records the LLID (e.g., "24") present in the message (the message shown in FIG. 6B). Thus, values of the "multicast group address" and "LLID" stored in the channel list are acquired.

Table 1 is a schematic table of the channel list acquired based on the above process. [Table 1]

TABLE 1

| Multicast group address | LLID |
| --- | --- |
| 225.1.1.21 | 24 |
| 225.1.1.22 | 56 |
| 225.1.1.23 | 43 |

When an authentication process needs to be considered, an authentication area is disposed in the channel list, and the authentication process is a selectable process. The optical network unit monitors a user's authentication message included in the user's channel start request to acquire the user's authentication message. It is thus possible to generate the channel list having the authentication area as shown in Table 2.

TABLE 2

| Multicast group address | LLID | Authentication | ISP |
| --- | --- | --- | --- |
| 225.1.1.21 | 24 | Possible | X |
| 225.1.1.22 | 56 | Possible | X |
| 225.1.1.23 | 43 | Impossible | Y |

In the passive optical network, the channel viewed by the terminal user constantly changes, and a channel state of the network continually changes. Therefore, the passive optical network system has to dynamically update the channel list. The channel list is continually updated using the channel information acquired by the monitoring unit.

Figure 3:
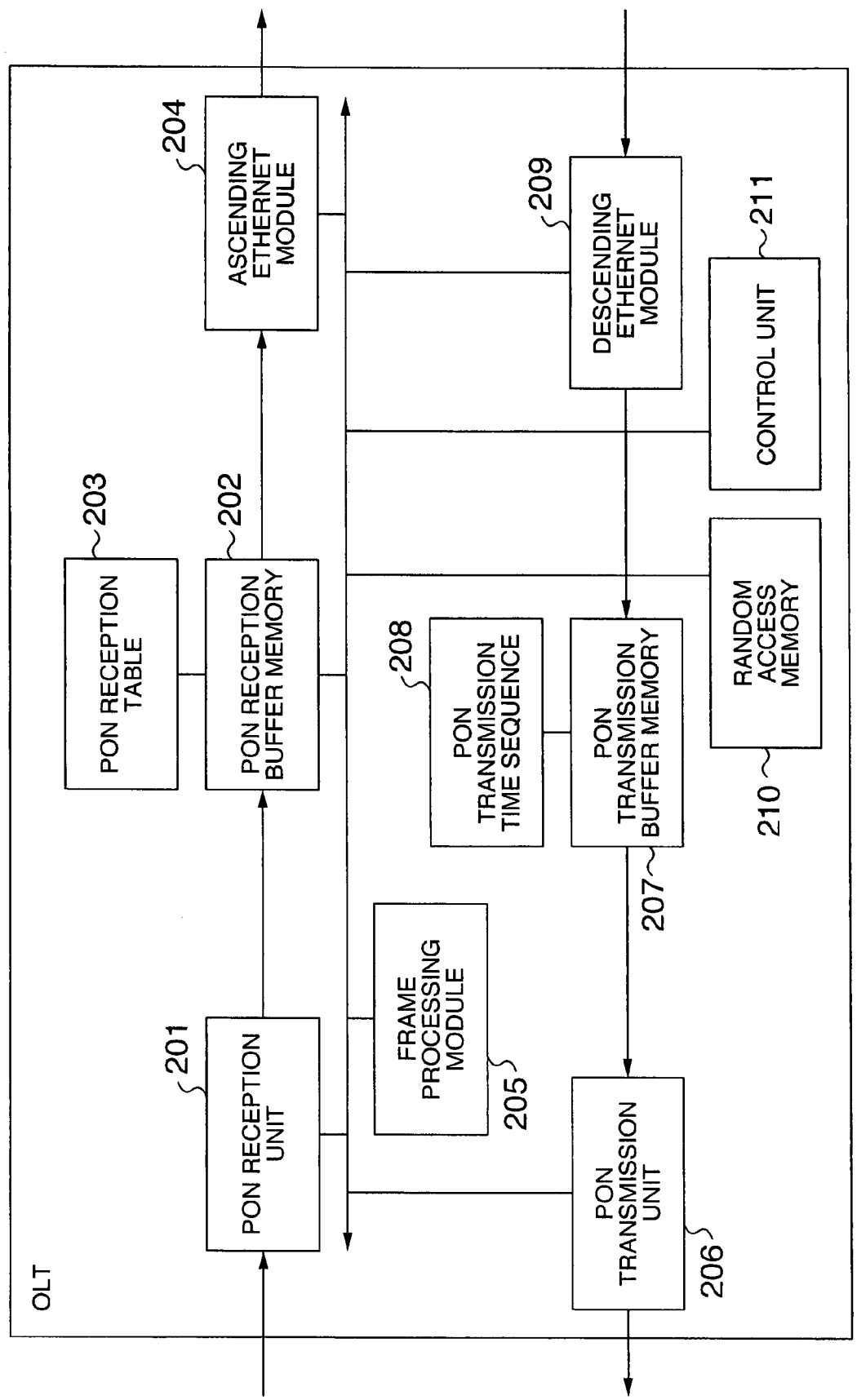
FIG. 3 is a schematic diagram to realize hardware of an optical line terminal OLT according to the present invention.

The channel switching of the present invention may be performed via the optical line terminal of the passive optical network OLT. FIG. 3 shows a hardware constitution of the OLT. The optical line terminal (OLT) includes a PON transmission/reception unit 201; a PON reception buffer memory 202; a PON reception table 203; an ascending Ethernet module 204; a PON transmission unit 206; a PON transmission buffer memory 207; a PON transmission time sequence 208; a descending Ethernet module 209; a frame processing unit 205; a control unit 211; and a memory 210.

In the drawing, the frame processing unit 205 has the same IGMP monitoring function as that of the IGMP monitoring unit of the optical network unit to monitor the IGMP packet included in the channel switching request. The memory 210 also has a channel list. In the channel list, the channel information received by the passive optical network and the corresponding channel optical transmission information are recorded.

The channel list of the optical line terminal is generated in the same manner as in the channel list of the optical network unit. The generation will hereinafter be described.

When the IPTV channel list is stored in the optical line terminal OLT, first the frame processing unit 205 of the optical line terminal OLT receives the IPTV channel list transmitted from the terminal user, and the IGMP monitoring unit of the frame processing unit monitors the channel list. In the request, the IGMP or MLD message is used.

The IGMP monitoring unit monitors the message shown in FIG. 6A, and acquires the multicast group address (e.g., "225.1.1.22"). When a value of a "type" indicated in the IGMP message is "2", it is meant that the user subscribes for the multicast group including the new channel and that the channel is started.

Next, the frame processing unit 205 of the optical line terminal OLT monitors the multicast message including the image data transmitted from the IPTV server. When the target address of the multicast message is the multicast group address (e.g., "225.1.1.22") of the new channel, the frame processing unit of the optical line terminal OLT assigns the LLID to the message to thereby acquire the message shown in FIG. 6B, and the message is recorded in the channel list (e.g., "56"). In this manner, values of the "multicast group address" and "LLID" stored in the channel list are acquired, and transmitted to the optical network unit.

The control unit 211 of the optical line terminal checks the channel list by use of the multicast address included in the channel switching request as an index, and acquires the optical transmission information of the channel switching. Here, a microprocessor may be used in the control unit 211.

However, the optical line terminal does not have any LLID filter included in the optical network unit. Therefore, when an optical network terminal acquires the optical transmission information of the channel switching, the acquired optical transmission information is notified to the optical network unit ONU by use of, for example, an OAM message, and the LLID filter unit 1023 of the optical network unit switches the channel in the same manner as in the optical network unit.

FIG. 7 is a schematic diagram showing Ethernet packet encapsulation of an MLD packet. The use of the IGMP packet (corresponding to the IPv4 protocol) in the channel switching request has been described above. The MLD packet (corresponding to the IPv6 protocol) has a format similar to that of the IGMP packet. Therefore, even the use of the MLD packet in the channel switching request can be applied to the present invention.

Figure 8:
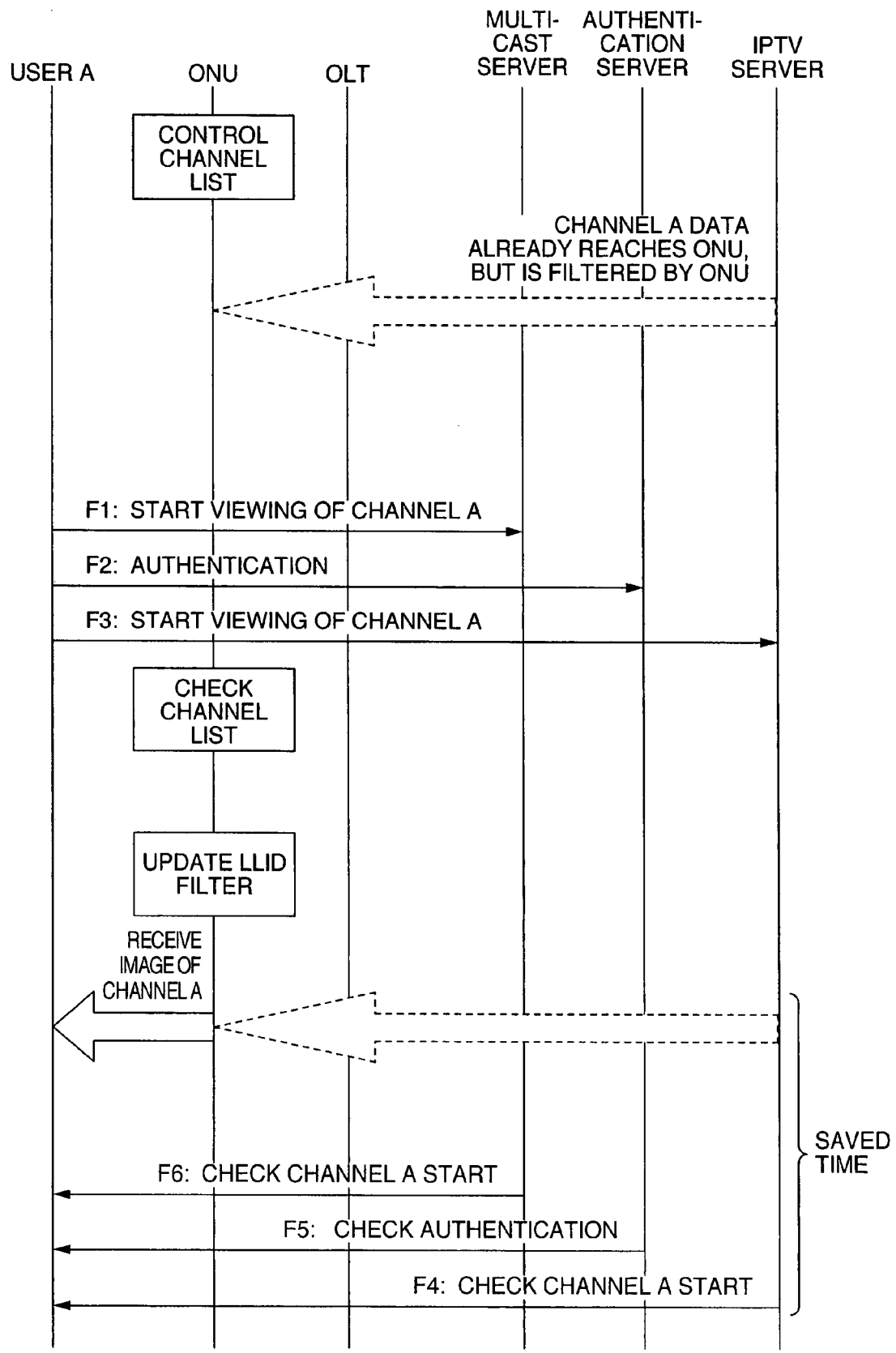
FIG. 8 is a flow chart showing control of a user's channel start message in an optical network unit ONU.

FIG. 8 is a flow chart showing control of a user's channel viewing start message in an optical network unit ONU. In a PON system, the optical network unit ONU generates and controls the channel list by the method shown in FIG. 5. Here, it is to be pointed out that, when the user transmits a request for channel viewing start, the IPTV server has already transmitted the image data to the optical network unit by a multicast system, but the data is filtered by the LLID filter unit. First, a user A transmits a viewing start message F1 to the multicast server to request the viewing start of a channel A. When authentication is required, the user A transmits a message F2 to an authentication server to request the authentication of the channel A. Moreover, the user A further transmits a message F3 to the IPTV server to request the viewing start of the channel A. Here, the message F1 may be the same as or different from the message F3. It is to be noted that the viewing start message F1 does not have to be necessarily transmitted to the multicast server to request the viewing start. After receiving the message F1, the optical network unit ONU checks the channel list to update the LLID filter. In this manner, the user A can receive an image of the channel A before receiving authentication messages "F4", "F5" and "F6".

As seen from the above description, according to the present invention, the channel list is disposed in the optical network unit ONU. Moreover, the control unit controls the LLID filter unit based on the channel list to control the channel. In a conventional example, after the channel start request reaches the multicast server and the IPTV server and an acknowledgment of the switching request is received, the viewing of the channel needs to be started. However, since this is not necessary, a channel start time is reduced.

Figure 9:
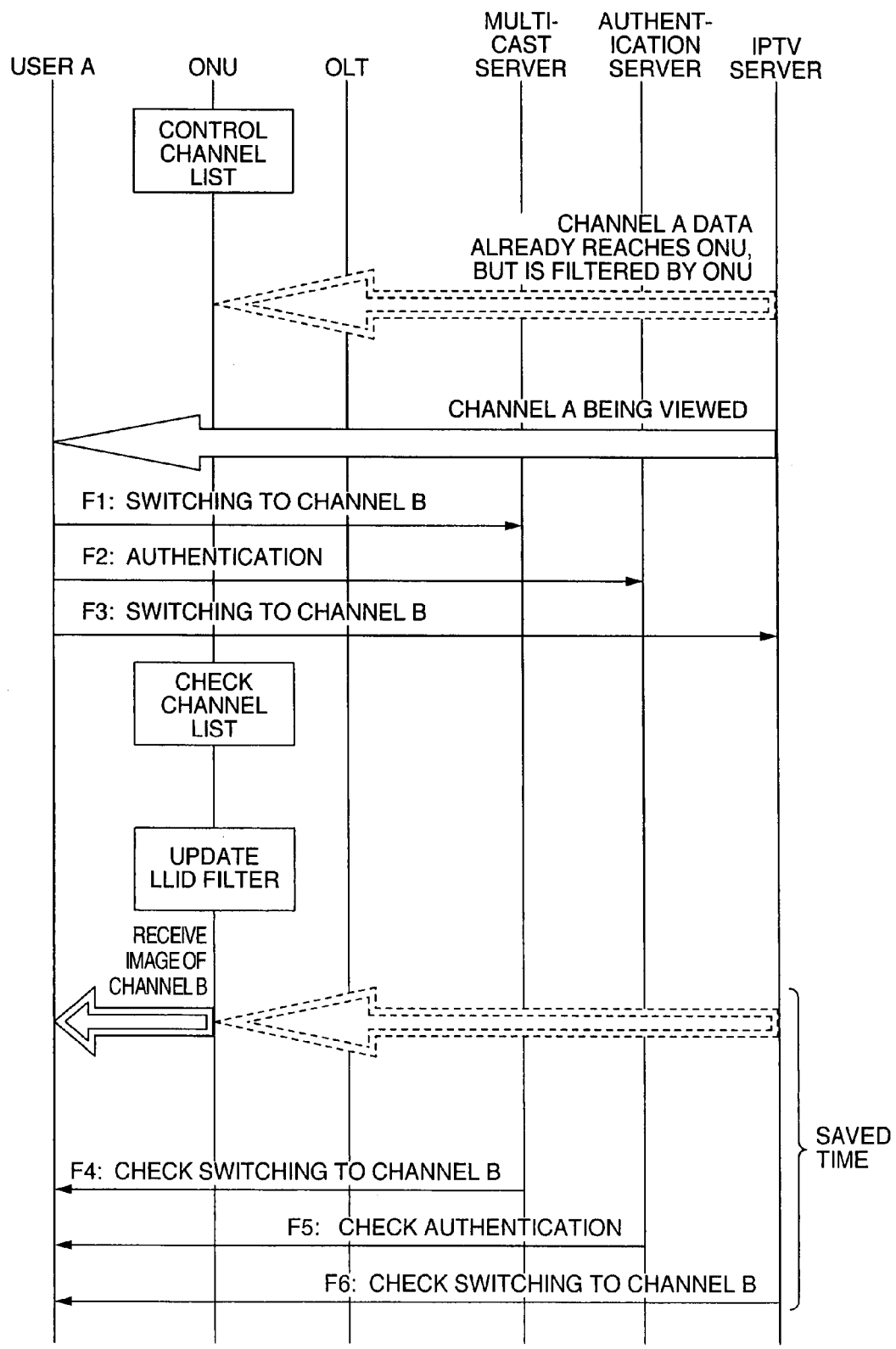
FIG. 9 is a flow chart showing control of a user's channel switching message in an optical network unit ONU.

FIG. 9 is a flow chart showing control of a user's channel switching message in the optical network unit ONU. In the PON system, the optical network unit ONU generates and controls the channel list by the method shown in FIG. 5. In a case where the user A views the channel A, to switch the channel, the user A transmits a message F1 to the multicast server to request the switching to a channel B. In this case, when the user transmits the request for the switching to the channel B, the IPTV server has already transmitted image packet data of the channel B to the optical network unit by the multicast system, but the data is filtered by the LLID filter unit. When the authentication is required, the user A further transmits a message F2 to the authentication server to request the authentication of the channel B. The user A further transmits a message F3 to the IPTV server to request the switching to the channel B. Here, the message F1 may be the same as or different from the message F3. It is to be noted that the viewing start message F1 does not have to be necessarily transmitted to the multicast server to request the switching.

After receiving the message F1, the optical network unit ONU checks the channel list to update the LLID filter. In this manner, the user A can receive an image of the channel B before receiving authentication messages "F4", "F5" and "F6".

As seen from the above description, according to the present invention, the channel list is disposed in the optical network unit ONU. Moreover, the control unit controls the LLID filter unit based on the channel list to control the channel. In a conventional example, after the channel start request reaches the multicast server and the IPTV server and the acknowledgment of the switching request is received, the viewing of the channel needs to be started. However, since this is not necessary, the channel start time is reduced.

Figure 10:
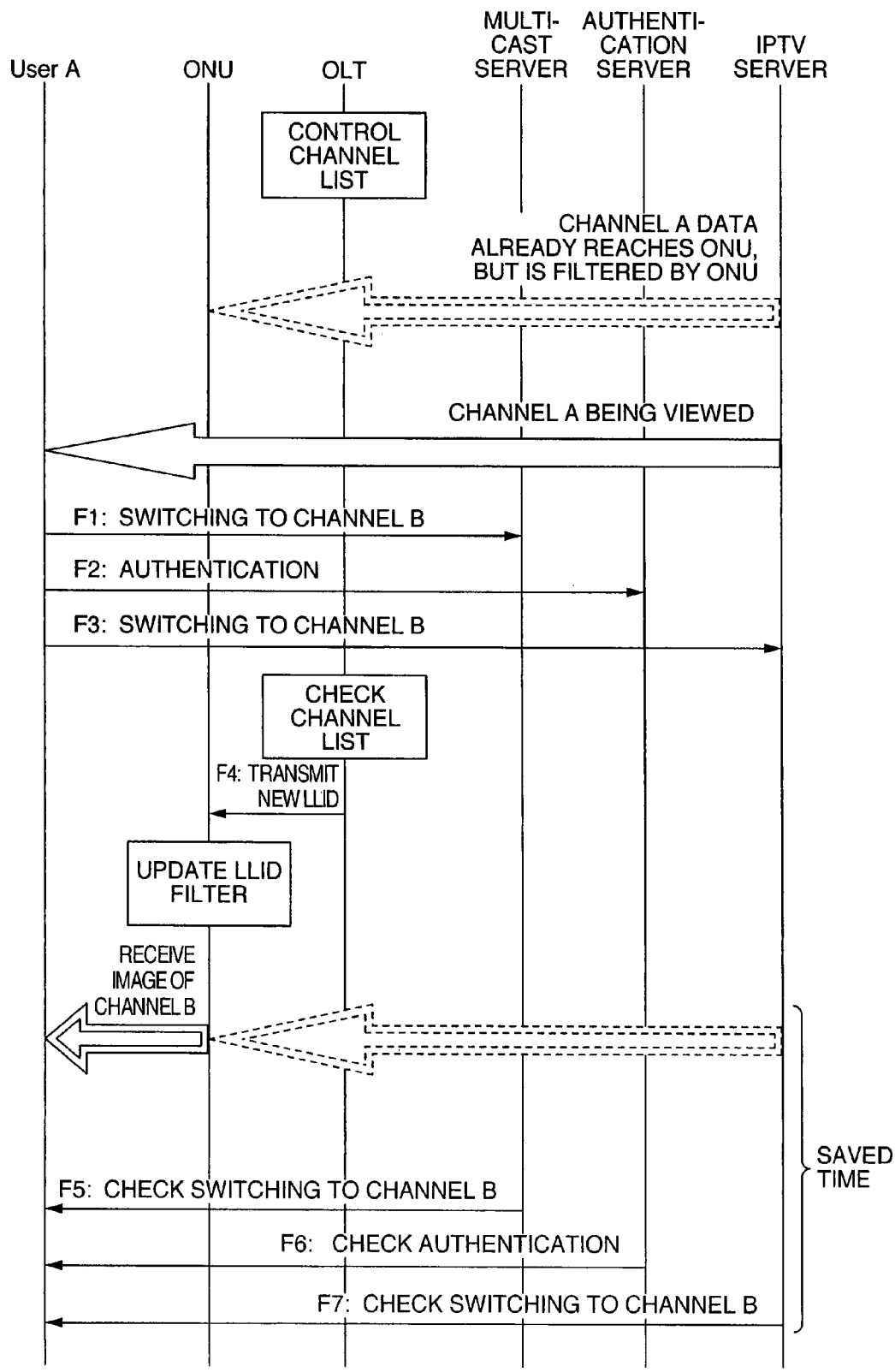
FIG. 10 is a flow chart showing control of a user's channel switching message in an optical line terminal OLT.

FIG. 10 is a flow chart showing control of a user's channel switching message in the optical line terminal OLT. In the PON system, the optical line terminal generates and controls the channel list by the method shown in FIG. 5. In a case where the user A views the channel A, to switch the channel, the user A transmits a message F1 to the multicast server to request the switching to a channel B. In this case, when the user transmits the request for the switching to the channel B, the IPTV server has already transmitted the image packet data of the channel B to the optical network unit by the multicast system, but the data is filtered by the LLID filter unit. When the authentication is required, the user A further transmits a message F2 to the authentication server to request the authentication of the channel B. The user A further transmits a message F3 to the IPTV server to request the switching to the channel B. Here, the message F1 may be the same as or different from the message F3. It is to be noted that the viewing start message F1 does not have to be necessarily transmitted to the multicast server to request the switching.

After receiving the message F1, the optical line terminal OLT checks the channel list to obtain a new channel LLID, and transmits a message F4 including the new channel LLID. The optical network unit ONU immediately updates the LLID filter. In this manner, the user A can receive the image of the channel B before receiving authentication messages "F5", "F6" and "F7".

An effect of the present invention differs with realization methods. Since the optical network unit ONU most quickly answers the user's message, the optical network unit performs the most effective realization method. Since the optical line terminal OLT is usually controlled by an internet service provider, the optical line terminal performs a safe realization method. The optical line terminal has the channel list which is larger than that of the optical network unit. The present invention can simultaneously be realized by the optical network unit and the optical line terminal. This is a so-called hierarchical realization method. Since this method has advantages of the above two methods, this is the most preferable realization method.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical network unit (ONU) of a passive optical network system having an optical line terminal (OLT) and a plurality of optical network units connected to terminal users and the optical line terminal,
the optical network unit comprising:
a memory;
a photoelectric conversion unit which photoelectrically converts signals from the terminal user and the optical line terminal; and
a frame processing unit having a monitoring unit which monitors a channel request transmitted from the terminal user and an optical layer filter which selectively transmits, to the terminal user, a frame signal transmitted through the optical line terminal from an IPTV server,
the memory being configured to hold a channel list to record a correspondence between channel information and optical transmission information of a channel of the passive optical network,
the optical network unit further comprising a control unit, and being configured to execute control so that the optical layer filter selects the frame signal having the optical transmission information corresponding to the channel information of a switch channel and to transmit the frame signal to the terminal user based on the channel information of the switch channel included in a channel switching request of the terminal user acquired from the monitoring unit with reference to the channel list.

2. The optical network unit according to claim 1, wherein the frame signal is transmitted through an IP core network having a multicast server from the IPTV server.

3. The optical network unit according to claim 2, wherein the control unit switches the channel based on the request of the terminal user after the terminal user transmits the channel switching request to the IPTV server which supplies an IPTV service and before the IPTV server transmits an acknowledgement of the channel switching request to the terminal user.

4. The optical network unit according to claim 1, wherein the channel list is updated using the channel information acquired by the monitoring unit.

5. The optical network unit according to claim 1, wherein the memory further includes an authentication list and stores an authentication recording corresponding to the channel information of the passive optical network; and
the frame processing unit updates the authentication list based on information received from an authentication server.

6. The optical network unit according to claim 1, wherein the channel information includes an multicast IP address.

7. The optical network unit according to claim 1, wherein an LLID stored in an EPON is used as the optical transmission information.

8. The optical network unit according to claim 1, wherein a T-Cont stored in a GPON is used as the optical transmission information.

9. The optical network unit according to claim 1, wherein the channel list is updated by an IGMP or MLD monitoring unit.

10. An optical line terminal of an optical network system having a plurality of optical network units connected to terminal users and an optical line terminal connected to the optical network units,
the optical line terminal comprising:
a memory;
a PON transmission/reception unit which receives a frame signal from an IPTV server to transmit the frame signal to the optical network unit; and
a frame processing unit having a monitoring unit which monitors a channel request transmitted from the terminal user,
the memory being configured to hold a channel list to record a correspondence between channel information and optical transmission information of a channel of the passive optical network,
the optical network unit further comprising a control unit, and being configured to distribute the optical transmission information of a switch channel and to notify the optical network unit of a result of the distribution to switch the channel based on the channel information of the switch channel included in a channel switching request of the terminal user acquired from the monitoring unit with reference to the channel list.

11. A passive optical network system comprising:
an optical line terminal; and
a plurality of optical network units connected to terminal users,
each of the optical network units including: a memory; a photoelectric conversion unit which photoelectrically converts signals from each terminal user and the optical line terminal; and a frame processing unit having a monitoring unit which monitors a channel request transmitted from the terminal user and an optical layer filter which selectively transmits, to the terminal user, a frame signal transmitted through the optical line terminal from an IPTV server, the memory being configured to hold a channel list to record a correspondence between channel information and optical transmission information of a channel of the passive optical network,
the optical network unit further having a control unit,
the optical network unit being configured to execute control so that the optical layer filter selects the frame signal having the optical transmission information corresponding to the channel information of a switch channel and to transmit the frame signal to the terminal user based on the channel information of the switch channel included in a channel switching request of the terminal user acquired from the monitoring unit with reference to the channel list, the optical line terminal including: a memory; a PON transmission/reception unit which receives a frame signal from an IPTV server to transmit the frame signal to the optical network unit; and a frame processing unit having a monitoring unit which monitors a channel request transmitted from the terminal user, the memory being configured to hold a channel list to record the correspondence between the channel information and the optical transmission information of the channel of the passive optical network, the optical network unit further including a control unit, and being configured to distribute the optical transmission information of the switch channel and to notify the optical network unit of a result of the distribution to switch the channel based on the channel information of the switch channel included in the channel switching request of the terminal user acquired from the monitoring unit with reference to the channel list.

12. A channel switching method in a passive optical network system which receives an IPTV service and including an optical line terminal and a plurality of optical network units connected to terminal users, wherein each optical network unit performs a step of storing a channel list to record a correspondence between channel information and optical transmission information of a channel of the passive optical network; a step of monitoring a channel request transmitted from each terminal user; and a step of selecting a frame signal having the optical transmission information corresponding to the channel information of a switch channel to transmit the frame signal to the terminal user based on the channel information of the switch channel included in a channel switching request from the terminal user with reference to the channel list.

13. A channel switching method in a passive optical network system which receives an IPTV service and including an optical line terminal and a plurality of optical network units connected to terminal users, wherein the optical line terminal performs a step of storing a channel list to record a correspondence between channel information and optical transmission information of a channel of the passive optical network; a step of monitoring a channel request transmitted from each terminal user; and a step of distributing the optical transmission information of a switch channel and notifying the optical network unit of a result of the distribution to switch the channel based on the channel information of the switch channel included in a channel switching request from the terminal user with reference to the channel list.

14. A channel switching method in a passive optical network system which receives an IPTV service and which includes an optical line terminal and a plurality of optical network units connected to terminal users, comprising the steps of:

storing a channel list to record a correspondence between channel information and optical transmission information of a channel of the passive optical network in memories of an optical line terminal and each optical network unit;

monitoring, by the optical line terminal, a channel request transmitted from each terminal user;

distributing the optical transmission information of a switch channel and notifying the optical network unit of a result of the distribution to switch the channel based on the channel information of the switch channel included in a channel switching request from the terminal user with reference to the channel list;

monitoring, by the optical network unit, a channel request transmitted from the terminal user; and selecting a frame signal having the optical transmission information corresponding to the channel information of the switch channel to transmit the frame signal to the terminal user based on the channel information of the switch channel included in the channel switching request from the terminal user with reference to the channel list.

* * * * *